United States Patent
Kawamoto et al.

[11] 3,970,294
[45] July 20, 1976

[54] SYNCHRONOUS RING IN A SYNCHRONOUS DEVICE

[75] Inventors: Tamio Kawamoto, Yokohama; Mitugu Ii, Yokosuka, both of Japan

[73] Assignee: Nissan Motor Co., Ltd., Yokohama, Japan

[22] Filed: Aug. 20, 1974

[21] Appl. No.: 498,926

[30] Foreign Application Priority Data
Aug. 21, 1973  Japan.............................. 48-93641

[52] U.S. Cl. .............................................. 267/161
[51] Int. Cl.² ........................................... F16F 1/34
[58] Field of Search ............. 267/1.5, 159, 161, 162

[56] References Cited
UNITED STATES PATENTS

| | | | |
|---|---|---|---|
| 1,439,845 | 12/1972 | Scib et al. | 267/1.5 |
| 2,870,291 | 1/1959 | Welsh | 267/159 |
| 3,378,268 | 4/1968 | Anderson | 267/1.5 |
| 3,774,896 | 11/1973 | Rode | 267/161 |

*Primary Examiner*—James B. Marbert

[57] ABSTRACT

A synchronous device for changing speed gears in a motor vehicle includes a slotted, springy, synchronous ring which is affectable by servo action and formed with at least one groove extending along at least a portion of the inner circumference of the ring.

5 Claims, 5 Drawing Figures

FIG. 1
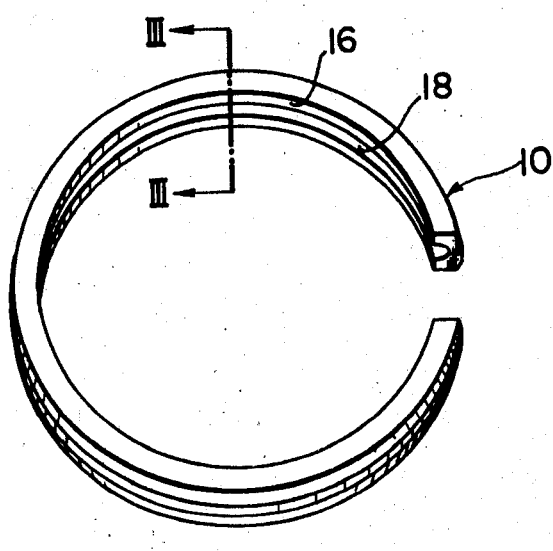
FIG. 2
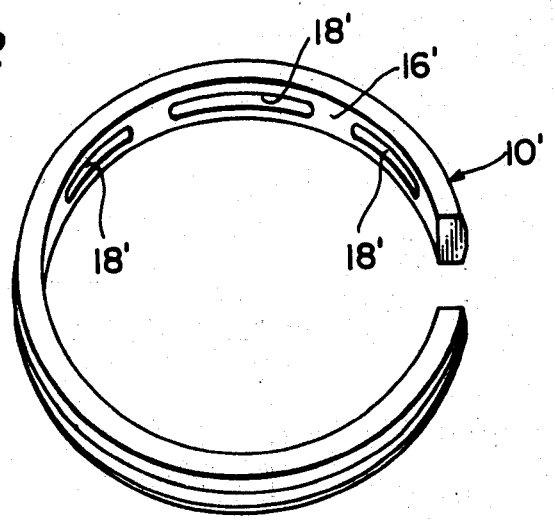
FIG. 3  FIG. 4  FIG. 5
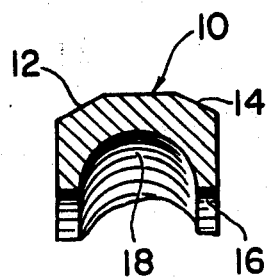 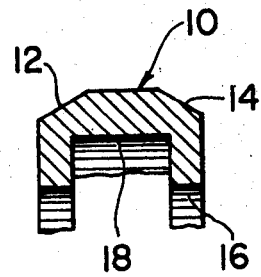 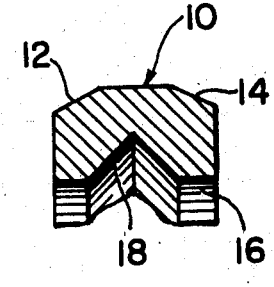

SYNCHRONOUS RING IN A SYNCHRONOUS DEVICE

The present invention relates generally to a synchronous device for a change speed gear, especially for motor vehicles, in which slotted or split synchronous rings are under the influence of a locking means that increase the servo effect thereof, and more particularly to a slotted synchronous ring for such synchronous devices. The present invention seeks to improve the synchronous devices of the type disclosed in U.S. Pat. No. 3,200,920 and illustrated, for example, in FIGS. 7 and 8 therein.

In order to increase the servo action of the slotted synchronous rings, it is conventional to use a blocking means in the form of blocking bands which are arranged between stops, which face each other, on the clutch body of the gear to be shifted. In the usual construction, a blocking band segment is provided for each working and circumferential direction which supports itself at a fixed stop.

It is also conventional to use blocking means formed from a slotted band that accommodates the slidable stop and which is supported between its ends by means of a cam like body in a recess of the clutch body of the gear to be shifted.

With a synchronous device employing blocking means of the above types, a large synchronous capacity sufficiently to ensure an adequate synchronous work in attempting to shift into the gear rotating at high speeds is obtained. However, because the synchronous capacity obtained by the above mentioned synchronous device is so great in attempting to shift into first gear when the vehicle is stationary considerable shifting power is necessary.

It is the aim of the present invention to vary the synchronous capacity of synchronous devices without design change of the locking means thereof, and without great manufacturing cost increase.

Based on the recognition that the synchronous capacity of synchronous devices increases in approximate proportion to the load applied to slotted rings when in the retained position in associated clutch bodies, it is proposed, in accordance with the present invention to groove the inner circumferential face of the conventional slotted synchronous ring to reduce the synchronous capacity.

Paying attention to theoretical basis for the above proposal, let us consider the following equation which, as is well known, determines the load W applied to a slotted synchronous ring under pre-stressed condition when retained in the associated clutch body.

$$W = \frac{C \times L \times E \times K}{14.14 \times (\frac{D}{T} - 1)} \quad (1)$$

where:

$C$ is the width of the synchronous ring.

$T$ is the thickness of the synchronous ring.

$D$ is the diameter of the synchronous ring under prestressed condition when retained in the associated clutch body.

$L$ is the spacing between the ends of the slotted synchronous ring under prestressed conditions when retained in the associated clutch body.

$F$ is the axial elastic module of the synchronous ring material (in the case that the material is steel, $2.1 \times 10^4$ kg/mm$^2$).

$K$ is the Kata factor of the synchronous ring (or tensile force deceleration factor of the synchronous ring).

If $C$, $T$, $D$, $L$ and $E$ are made constant, the load applied to slotted synchronous ring is proportional to $K$. The Kata factor $K$ is determined by dividing the product of inertia of area $I'$ by the product of inertia of area having a rectangle $C$ by $T$, as expressed as follows.

$$K = \frac{I'}{I} \quad (2)$$

From this equation it will be understood that changing $I'$ by grooving the inner circumference of a conventional synchronous ring will effect the reduction of the synchronous capacity of the associated synchronous device.

One object of the present invention resides in the provision of a slotted synchronous ring grooved in the inner circumference thereof.

A still further object of the present invention resides in the provision of a slotted synchronous ring grooved locally or intermittently along the inner circumference thereof.

A still further object of the present invention resides in the provision of a slotted synchronous ring having a plurality of grooves arranged in a spaced relationship along inner circumference thereof.

Two embodiments of the present invention are illustrated in the accompanying drawing, wherein:

FIG. 1 shows a complete slotted synchronous ring in perspective end view thereof according to one embodiment of the invention;

FIG. 2 shows another complete slotted synchronous ring in perspective end view thereof according to second embodiment of the invention;

FIG. 3 is a cross sectional view taken through III—III in FIG. 1; and

FIGS. 4 and 5 are views similar to FIG. 3 showing alternatives of profile of groove.

Referring now to the accompanying drawing, particularly to FIGS. 1 and 3, a slotted synchronous ring 10 is provided with chamfers 12 and 14, the chamfer 12 serving for centering and the chamfer 14 for synchronizing. The slotted synchronous ring 10, according to the invention, has formed in its inner circumference 16 thereof a groove 18. The groove extends entirely along the inner circumference of the slotted synchronous ring and has a semicircular cross sectional profile as best illustrated in FIG. 3. Groove 18 may, if desired, have a rectangular cross sectional profile (see FIG. 4) or triangular cross sectional profile (see FIG. 5).

Although in the embodiment illustrated in FIG. 1 one groove 18 extends entirely along the inner circumference 16 of the synchronous ring 10, such a groove may extend locally in the inner circumference of the synchronous ring. Alternatively, as illustrated in FIG. 2, a plurality of such grooves 18 may be disposed in the inner circumference of synchronous ring 10' parallel and spaced from each other.

From the preceding description, the invention is particularly useful, although not limited to only this utility, where it is desired to reduce the synchronous capacity of conventional synchronous devices to meet preferable synchronous capacity requirements for a particular speed gear. It should be understood that the invention may be applied to any conventional slotted synchronous ring for conventional synchronous devices.

What is claimed is:

1. In a synchronous device for changing speed gears of a motor vehicle, in which a slotted, springy, synchronous ring, which has an inner circumference, is affectable by servo action, the improvement comprising a plurality of grooves for reducing synchronous capacity of the synchronous device, said grooves being disposed in said inner circumference of said synchronous ring in spaced circumferential relationship with each other.

2. In a synchronous device for changing speed gears of a motor vehicle, in which a slotted, springy, synchronous ring, which has an inner circumference, is affectable by servo action, the improvement comprising a plurality of grooves disposed in said inner circumference of said synchronous ring for reducing synchronous capacity of the synchronous device, said grooves being spaced circumferentially from each other.

3. The improvement as claimed in claim 2, wherein each of said grooves has a semicircular cross-sectional profile.

4. The improvement as claimed in claim 1, wherein each of said grooves has a rectangular cross-sectional profile.

5. The improvement as claimed in claim 1, wherein each of said grooves has a triangular cross-sectional profile.

* * * * *